UNITED STATES PATENT OFFICE 2,424,590

PREPARATION OF BETA LACTONES

Thomas R. Steadman and Paul L. Breyfogle, Akron, Ohio, assignors to The B. F. Goodrich Company, New York, N. Y., a corporation of New York No Drawing. Application October 14, 1944, Serial No. 558,744

6 Claims. (Cl. 260—344)

This invention relates to the preparation of beta hydroxy carboxylic acid lactones and pertains more specifically to their synthesis by reacting a ketene with a carbonyl compound such as an aldehyde or a ketone.

It has previously been proposed to react a ketene with a carbonyl compound in the presence of a Friedel-Crafts type catalyst, such as the halides of boron, zinc, aluminum, tin, titanium, and iron or complexes of these halides with organic compounds such as ethyl ether, ethyl chloride, or the like. Although fairly good yields are obtained by such a process, it has been found that most of the loss is caused by the formation of a high boiling material, which is obtained as a residue upon distillation of the product.

We have now discovered that the formation of this high boiling or resinous material may be largely eliminated with consequent improvement in the yield of desired beta lactones by the use of a special type of catalyst. This new catalyst comprises as an essential component a mixture of an aluminum halide with a minor proportion of a zinc halide, preferably a mixture of aluminum chloride with a minor proportion of zinc chloride. It is believed that the zinc chloride serves to activate the aluminum chloride, since the use of the latter material by itself gives varying results with generally lower yields than does the mixture. The use of zinc chloride alone, on the other hand, produces larger amounts of high boiling material and consequently a lower yield of the desired product than does the use of the mixture.

Although the relative proportions of the aluminum halide and zinc halide in our new catalyst may vary over a wide range, it has been found that the weight of the zinc halide used should be less than the weight of the aluminum halide. It is preferred to use a mixture containing one part by weight of aluminum halide with from about 0.03 to 0.5 part by weight of zinc halide; best results are obtained by using a mixture of one part by weight of aluminum halide with from 0.05 to 0.15 part by weight of zinc halide. We have also discovered that ternary mixtures of aluminum halide with zinc halide and with ferric halide are much superior to any of the three alone; particularly valuable are those containing one part by weight of aluminum chloride, 0.03 to 0.5 part of zinc chloride, preferably 0.05 to 0.15 part, and 0.05 to 0.15 part of ferric chloride. The reaction with our new catalyst may be carried out with the reagents either in the vapor phase or in solution. When the first method is used, it is desirable to employ a carrier, such as silica gel, activated charcoal, diatomaceous earth or the like, in conjunction with the catalyst. When the second method is used, it is necessary only to dissolve or disperse the catalyst in the solvent medium. The amount of catalyst used may likewise be varied over a wide range depending upon the particular reactant used, as well as upon the conditions of the reaction. As little as 0.05 grams or less of catalyst may be used for each mole of reactant, although larger amounts produce no deleterious effects.

The reactants with which our new catalyst is effective include ketene having the structure

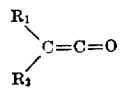

in which $R_1$ and $R_2$ represent hydrogen or hydrocarbon groups, and compounds containing a carbonyl group as the sole functional group, that is, compounds having the structure

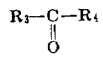

in which $R_3$ and $R_4$ represent hydrogen or hydrocarbon groups free from olefinic and acetylenic bonds. The parent compound, ketene, $CH_2=C=O$, is preferably employed as the ketene in this reaction, but its aliphatic and aromatic homologs, including the aldoketenes such as methyl ketene, ethyl ketene, propyl ketene, butyl ketene and phenyl ketene as well as the ketoketenes, such as dimethyl ketene, diethyl ketene, dipropyl ketene, diphenyl ketene, and the like, may also be employed. The carbonyl compounds which may be employed fall into two chief classes: first, aldehydes having the structure $R_3$—CHO, in which $R_3$ represents hydrogen, an alkyl group (that is, a saturated aliphatic open-chain hydrocarbon group having the formula, $C_nH_{2n+1}$) an aryl group (that is, a monovalent aromatic hydrocarbon group whose free valence is directly connected to the aromatic ring), free from olefinic and acetylenic bonds, an aralkyl group (that is, an alkyl group having one or more of its hydrogens replaced by an aryl group), or a cycloalkyl group (that is, a monovalent hydrocarbon radical derived by the removal of a hydrogen atom from a cycloparaffin); low molecular weight, unsubstituted, saturated aliphatic aldehydes are preferred; second, ketones having the structure

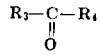

in which both $R_3$ and $R_4$ are alkyl, aryl, aralkyl, or cycloalkyl groups as defined above. Among the aldehydes and ketones which may be employed are formaldehyde, acetaldehyde, propionaldehyde, n-butyraldehyde, isobutyraldehyde, benzaldehyde, phenyl acetaldehyde, hexahydrobenzaldehyde, acetone, methyl ethyl ketone, methyl n-propyl ketone, diethyl ketone, ethyl isopropyl ketone, diethyl ketone, ethyl isopropyl ketone, methyl isobutyl ketone, acetophenone, benzophenone, methyl benzyl ketone, methyl cyclohexyl ketone and other similar compounds.

Because of the great reactivity of the ketene and the lower aldehydes, it is usually desirable to carry out the reaction in the presence of a solvent or diluent and at temperatures below about 30° C. The reaction may be successfully carried out at temperatures as low as —60° C., although the range from about 0° to about 20° C. is usually more convenient. Any of the common organic solvents which dissolves both of the reactants and which is itself relatively inert to the reactants may be employed. Among suitable materials are acetone, diethyl ether, methyl ethyl ether, dioxane, ethyl chloride, ethylene dichloride, carbon disulfide, or the like. Although acetone and methyl ethyl ketone themselves react with ketene, the reaction is relatively slow as compared with the reaction between ketene and aldehydes, particularly formaldehyde, so that they may be used as solvents when these reactants are employed. The beta lactone produced in the reaction may itself be used as solvent in many cases, an expedient which eliminates the necessity for separating the product from the solvent.

An excess of either of the reactants over the amount theoretically required usually produces no particular advantages; in practice, it is usually most economical to employ approximately equimolar proportions.

The following specific example will serve more fully to illustrate the nature of our invention. Gaseous ketene is prepared by the pyrolysis of acetone vapor with an electrically heated platinum or nichrome spiral, with reflux of unconverted acetone. The rate of ketene formation is readily controlled by varying the voltage across the pyrolysis coil. Gaseous formaldehyde is obtained by heating solid, granular 95% paraformaldehyde by means of a salt bath maintained at 160° to 210° C. The solid polymer is fed from a hopper to the depolymerizer at a predetermined rate by means of a gas-tight screw conveyor operated intermittently on a 60-second cycle. The stream of gaseous formaldehyde is carried along through a heated glass tube by a slow but steady flow of nitrogen, is mixed with the stream of ketene and then led below the surface of a stirred solution consisting of one gram of aluminum chloride and 0.1 gram of zinc chloride dissolved in 200 grams of beta-propiolactone. The reaction mixture is maintained at a temperature of about 5° to 20° C. by means of a water bath, and the reactants are introduced at the rate of approximately 0.5 mole per hour. After a period of six hours, the addition of the reactants is discontinued. The reaction mixture is then distilled at a pressure of 10 mm., the desired beta-propiolactone boiling at 49 to 51° C. at this pressure. The catalyst may be destroyed prior to the distillation by adding a small amount of alkali, if desired, although this step is not essential. The desired lactone is obtained in much higher yield, and the residue of high boiling polymeric material is much less than when either aluminum chloride or zinc chloride is used alone as the catalyst under similar conditions. Similar results may be obtained when there is used as catalyst a mixture of one gram of aluminum chloride with 0.1 gram of zinc chloride and 0.1 gram of ferric chloride.

Various modifications in the reaction conditions may be made when reactants other than those given in the specific example are used. For example, many of the higher homologues of ketene and formaldehyde which are not gases at ordinary temperatures need not be vaporized before introduction into the reaction mixture. The separation of the lactone from the catalyst may be accomplished by various methods. Because of the tendency of lactones to polymerize when heated at atmospheric pressure, particularly in the presence of catalysts, it may be desirable in some cases to destroy the catalyst with a strong alkali before isolation of the product by distillation at reduced pressure, although this step is not essential.

Although we have herein described the specific embodiments of our invention, we do not intend to limit ourselves solely thereto, but to include all of the obvious variations and modifications falling within the spirit and scope of the appended claims.

We claim:

1. In the process of preparing beta-propiolactone by reacting ketene with formaldehyde, the step which comprises carrying out the reaction at a temperature below about 30° C. in the presence of a catalyst comprising as an essential component a mixture of one part by weight of aluminum chloride with from 0.03 to 0.5 part by weight of zinc chloride.

2. In the process of preparing beta-propiolactone by reacting ketene with formaldehyde, the step which comprises carrying out the reaction at a temperature below about 30° C. in a solvent for both reactants consisting of propiolactone in the presence of a catalyst comprising as an essential component a mixture of one part by weight of aluminum chloride with from 0.03 to 0.5 part by weight of zinc chloride.

3. In the process of preparing beta-propiolacone by reacting ketene with formaldehyde, the step which comprises carrying out the reaction at a temperature below about 30° C. in a solvent for both reactants consisting of preformed beta propiolactone in the presence of a catalyst comprising as an essential component a mixture of one part by weight of aluminum chloride with from 0.05 to 0.15 part by weight of zinc chloride.

4. In the process of preparing beta-propiolactone by reacting ketene with formaldehyde, the step which comprises carrying out the reaction at a temperature below about 30° C. in a solvent for both reactants consisting of preformed beta propiolactone in the presence of a catalyst comprising as an essential component a mixture of one part by weight of aluminum chloride with from 0.05 to 0.15 part by weight of zinc chloride and with from 0.05 to 0.15 part by weight of ferric chloride.

5. In the process of preparing beta propiolactone by reacting ketene with formaldehyde, the step which comprises carrying out the reaction at a temperature below about 30° C. in acetone solution in the presence of a catalyst comprising as an essential component a mixture of one part by weight of aluminum chloride with from 0.03 to 0.5 part by weight of zinc chloride.

6. In the process of preparing beta propiolactone by reacting ketene with formaldehyde, the step which comprises carrying out the reaction in the presence of a catalyst comprising as an essential component a mixture of one part by weight of aluminum chloride with from 0.03 to 0.5 part by weight of zinc chloride.

THOMAS R. STEADMAN.
PAUL L. BREYFOGLE.

REFERENCES CITED

The following references are of record in the file of this patent:

UNITED STATES PATENTS

| Number | Name | Date |
|---|---|---|
| 2,356,459 | Krug | Aug. 22, 1944 |

Certificate of Correction

July 29, 1947.

Patent No. 2,424,590.

THOMAS R. STEADMAN ET AL.

It is hereby certified that error appears in the printed specification of the above numbered patent requiring correction as follows: Column 4, line 50, claim 2, after "consisting of" insert *preformed beta-*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.* tone by reacting ketene with formaldehyde, the step which comprises carrying out the reaction at a temperature below about 30° C. in acetone solution in the presence of a catalyst comprising as an essential component a mixture of one part by weight of aluminum chloride with from 0.03 to 0.5 part by weight of zinc chloride.

6. In the process of preparing beta propiolactone by reacting ketene with formaldehyde, the step which comprises carrying out the reaction in the presence of a catalyst comprising as an essential component a mixture of one part by weight of aluminum chloride with from 0.03 to 0.5 part by weight of zinc chloride.

THOMAS R. STEADMAN.
PAUL L. BREYFOGLE.

REFERENCES CITED

The following references are of record in the file of this patent:

UNITED STATES PATENTS

| Number | Name | Date |
| --- | --- | --- |
| 2,356,459 | Krug | Aug. 22, 1944 |

Certificate of Correction

July 29, 1947.

Patent No. 2,424,590.

THOMAS R. STEADMAN ET AL.

It is hereby certified that error appears in the printed specification of the above numbered patent requiring correction as follows: Column 4, line 50, claim 2, after "consisting of" insert *preformed beta-*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*